US011402086B2

(12) United States Patent
Yoshimori et al.

(10) Patent No.: US 11,402,086 B2
(45) Date of Patent: Aug. 2, 2022

(54) FLOODLIGHT

(71) Applicant: LIGHTBOY CO., LTD., Tokyo (JP)

(72) Inventors: Norihito Yoshimori, Tokyo (JP);
Hirotoshi Ishizawa, Tokyo (JP); Koji Tsuchiya, Tokyo (JP); Satomi Kugimiya, Tokyo (JP)

(73) Assignee: LIGHTBOY CO., LTD., Tokyo (JP)

( * ) Notice: Subject to any disclaimer, the term of this patent is extended or adjusted under 35 U.S.C. 154(b) by 0 days.

(21) Appl. No.: 17/269,882

(22) PCT Filed: Jul. 31, 2019

(86) PCT No.: PCT/JP2019/030087
§ 371 (c)(1),
(2) Date: Feb. 19, 2021

(87) PCT Pub. No.: WO2020/039870
PCT Pub. Date: Feb. 27, 2020

(65) Prior Publication Data
US 2021/0317973 A1 Oct. 14, 2021

(30) Foreign Application Priority Data

Aug. 24, 2018 (JP) .............................. JP2018-156931

(51) Int. Cl.
*F21V 21/22* (2006.01)
*F21V 21/30* (2006.01)
(Continued)

(52) U.S. Cl.
CPC .............. *F21V 21/22* (2013.01); *F21V 21/30* (2013.01); *F21S 9/02* (2013.01); *F21S 9/04* (2013.01);
(Continued)

(58) Field of Classification Search
CPC .......... F21V 21/22; F21V 21/30; F21V 21/38; F21S 9/02; F21S 9/04; F21Y 2113/20;
(Continued)

(56) References Cited

U.S. PATENT DOCUMENTS

| 6,237,904 | B1 * | 5/2001 | Shepherd ............... B60G 11/14 267/150 |
| 6,276,811 | B1 * | 8/2001 | Yoshimori ............ E04H 12/182 362/171 |

(Continued)

FOREIGN PATENT DOCUMENTS

| JP | 1998172337 | * | 6/1998 | .............. F21V 21/22 |
| JP | 2000-082306 A | | 3/2000 | |

(Continued)

OTHER PUBLICATIONS

English Translation of Description, JP 1998172337, Jun. 26, 1998, Kuno et al (Year: 1998).*

(Continued)

*Primary Examiner* — Peggy A Neils
(74) *Attorney, Agent, or Firm* — Paratus Law Group, PLLC

(57) ABSTRACT

One purpose is to smoothly raise and lower a telescopic post used in a floodlight. There is provided a floodlight that includes: a telescopic post that has a plurality of posts whose outer diameters are made gradually smaller, into which the posts can be loosely fitted, and that can be extended and contracted in an up-down direction; a lighting unit attached to the post located on the innermost side; a raising and lowering unit that extends and contracts, in the up-down direction, the posts in conjunction with each other; a base that the post located on the outermost side is fixed to; and (Continued)

dampers that connect a side surface of the post located on the outermost side and a side surface of the post located on the second outermost side.

5 Claims, 7 Drawing Sheets

(51) Int. Cl.
    *F21Y 113/20*     (2016.01)
    *F21Y 115/10*     (2016.01)
    *F21S 9/02*     (2006.01)
    *F21S 9/04*     (2006.01)

(52) U.S. Cl.
    CPC ........ *F21Y 2113/20* (2016.08); *F21Y 2115/10* (2016.08)

(58) Field of Classification Search
    CPC .... F21Y 2115/10; F16F 13/007; F16M 11/26; E04H 12/182; F21W 2131/10
    See application file for complete search history.

(56) References Cited

U.S. PATENT DOCUMENTS

| | | | |
|---|---|---|---|
| 7,234,847 | B2 | 6/2007 | Yoshimori et al. |
| 7,988,343 | B2 * | 8/2011 | Palmisano, Jr. ........ F21V 27/00 |
| | | | 362/424 |
| 9,598,875 | B1 * | 3/2017 | Bateman ................ E04H 12/182 |
| 10,618,580 | B2 * | 4/2020 | Kennedy ................. F21V 21/22 |
| 2007/0014116 | A1 | 1/2007 | Yoshimori et al. |

FOREIGN PATENT DOCUMENTS

| | | |
|---|---|---|
| JP | 2005-203237 A | 7/2005 |
| WO | WO 2005/068901 A1 | 7/2005 |

OTHER PUBLICATIONS

Sep. 10, 2019, International Search Opinion issued for related PCT application No. PCT/JP2019/030087.

Sep. 10, 2019, International Search Report issued for related PCT application No. PCT/JP2019/030087.

* cited by examiner

FLOODLIGHT

CROSS REFERENCE TO PRIOR APPLICATION

This application is a National Stage Patent Application of PCT International Patent Application No. PCT/JP2019/030087 (filed on Jul. 31, 2019) under 35 U.S.C. § 371, which claims priority to Japanese Patent Application No. 2018-156931 (filed on Aug. 24, 2018), which are all hereby incorporated by reference in their entirety.

TECHNICAL FIELD

The present invention relates to a floodlight that lights the surroundings in road construction, construction work, various events, etc., and particularly relates to a floodlight provided with a telescopic post that is installed on a base such as a dolly.

BACKGROUND ART

It is preferable that when intending to light a large area, a floodlight that lights the surroundings in road construction, construction work, and various events lights from as high a position as possible. Therefore, the floodlight may be provided with a telescopic post for adjusting the height of a lighting means.

CITATION LIST

Patent Literature

Patent Literature 1: JP 2005-203237 A

SUMMARY OF INVENTION

Technical Problem

Patent Literature 1 discloses a floodlight having a telescopic post that can change the height of a lighting means. A damper as a biasing means is provided inside the telescopic post. One end of the damper is fixed to a first post, and the other end is fixed to a second post. A pulley that makes a wire running between the first post and a third post slide on is provided at the tip of the damper. With such a configuration, the entire telescopic post is extended and contracted in conjunction with each other by extending and contracting the second post. Further, with the above configuration, the first to third posts can be extended and contracted without worrying about the rotational positions of the posts, although the posts are formed of circular pipes.

In the telescopic post used in the floodlight described in Patent Literature 1, a damper for imparting a biasing force for extension and contraction is arranged inside the telescopic post. As the damper, it is considered that, for example, a gas damper is used, but it is considered that the biasing force may decrease due to escape of the internal gas over time. If such a problem occurs with the damper, major repairs such as dismantling the telescopic post are required. In addition, if the rod of the damper is scratched, it is considered that the internal gas can easily escape. However, it has been difficult to observe the state of the rod from the outside.

Solution to Problem (Configuration 1-1)
One of the purposes of the floodlight according to the present invention is to solve such a problem, and in order to make the maintenance of a damper for imparting a biasing force for extension and contraction easy and prevent in advance a decrease in the biasing force, etc., by making it easy to observe the damper from the outside, the following configuration is adopted.

The floodlight includes:
a telescopic post that has a plurality of posts whose outer diameters are made gradually smaller, into which the posts can be loosely fitted, and that can be extended and contracted in an up-down direction;
a lighting unit attached to the post located on the innermost side;
a raising and lowering unit that extends and contracts, in the up-down direction, the posts in conjunction with each other;
a base that the post located on the outermost side is fixed to; and
a damper that connects a side surface of the post located on the outermost side and a side surface of the post located on the second outermost side.

(Configuration 1-2)
Further, in the floodlight according to the present invention,
the damper has a cylinder and a piston to be housed in the cylinder, in which
a side of the piston is fixed to a side surface of the post located on the outermost side, and a side of the cylinder is fixed to a side surface of the post located on the second outermost side.

(Configuration 1-3)
Furthermore, in the floodlight according to the present invention,
a lower portion of the damper is located in a cover.

(Configuration 1-4)
Still furthermore, in the floodlight according to the present invention,
a plurality of the dampers are provided.

(Configuration 1-5)
Still furthermore, in the floodlight according to the present invention,
a movement regulating unit and a space-forming unit are formed, in terms of cross section, between the posts adjacent to each other, in which
the movement regulating unit regulates a telescopic movement with the post located on an inner side brought close to the post located on an outer side, and
the space-forming unit allows a member that performs a telescopic movement to be arranged, with the post located on an inner side spaced apart from the post located on an outer side.

Configuration 2-1)
In the present invention, not only the floodlight but also the telescopic post for raising and lowering various members may be the only object of the invention. Therefore, the telescopic post according to the present invention adopts the following configuration.

The telescopic post is a telescopic post that has a plurality of posts whose outer diameters are made gradually smaller, into which the posts can be loosely fitted, and that can be extended and contracted in an up-down direction, in which a movement regulating unit and a space-forming unit are formed, in terms of cross section, between the posts adjacent to each other, the movement regulating unit regulates a telescopic movement with the post located on an inner side brought close to the post located on an outer side, and the space-forming unit allows a member that performs a telescopic movement to be arranged, with the post located on an inner side spaced apart from the post located on an outer side.

(Configuration 2-2)

Further, the telescopic post according to the configuration 2-1 has:

a pulley arranged on an inner wall of the post located on the outer side of the space formed by the space-forming unit; and a wire that is wound around the pulley to connect the post located on the inner side of the space and the post located further outside of the post that the pulley is provided to.

(Configuration 2-3)

Furthermore, in the telescopic post according to the configuration 2-2, a rotating shaft of the pulley is provided to be perpendicular or substantially perpendicular to the wall surface of the post.

(Configuration 2-4)

Still furthermore, in the telescopic post according to the configuration 2-1, a plurality of the space-forming units are each provided between the posts adjacent to each other, and the space-forming units are provided at different positions in terms of the cross-sectional circumferences of the posts.

(Configuration 2-5)

Still furthermore, the telescopic post according to the configuration 2-1 includes a damper that connects a side surface of the post located on the outermost side and a side surface of the post located on the second outermost side.

Advantageous Effects of Invention

According to the floodlight of the present invention, a telescopic movement of the telescopic post can be performed smoothly by providing dampers to the telescopic post. Further, various maintenance such as replacement of the damper can be facilitated since the dampers are provided outside the telescopic post. Furthermore, scratches, etc., occurring in the rod of the damper can be early detected, so that a failure, possibly occurring in the damper, can also be prevented in advance.

Still furthermore, in the telescopic post according to the present invention, the posts can be slid smoothly and vertically (or substantially vertically) by providing the movement regulating units and the space-forming units between the posts adjacent to each other. By housing members for performing telescopic movements, such as pulleys and wires, in the spaces formed by the space-forming units, these members can be moved without being hindered by extension and contraction, smooth extension and contraction can be made, and failures of the members for performing telescopic movements, such as pulleys and wires, can be suppressed.

DESCRIPTION OF EMBODIMENTS

Figure 1:
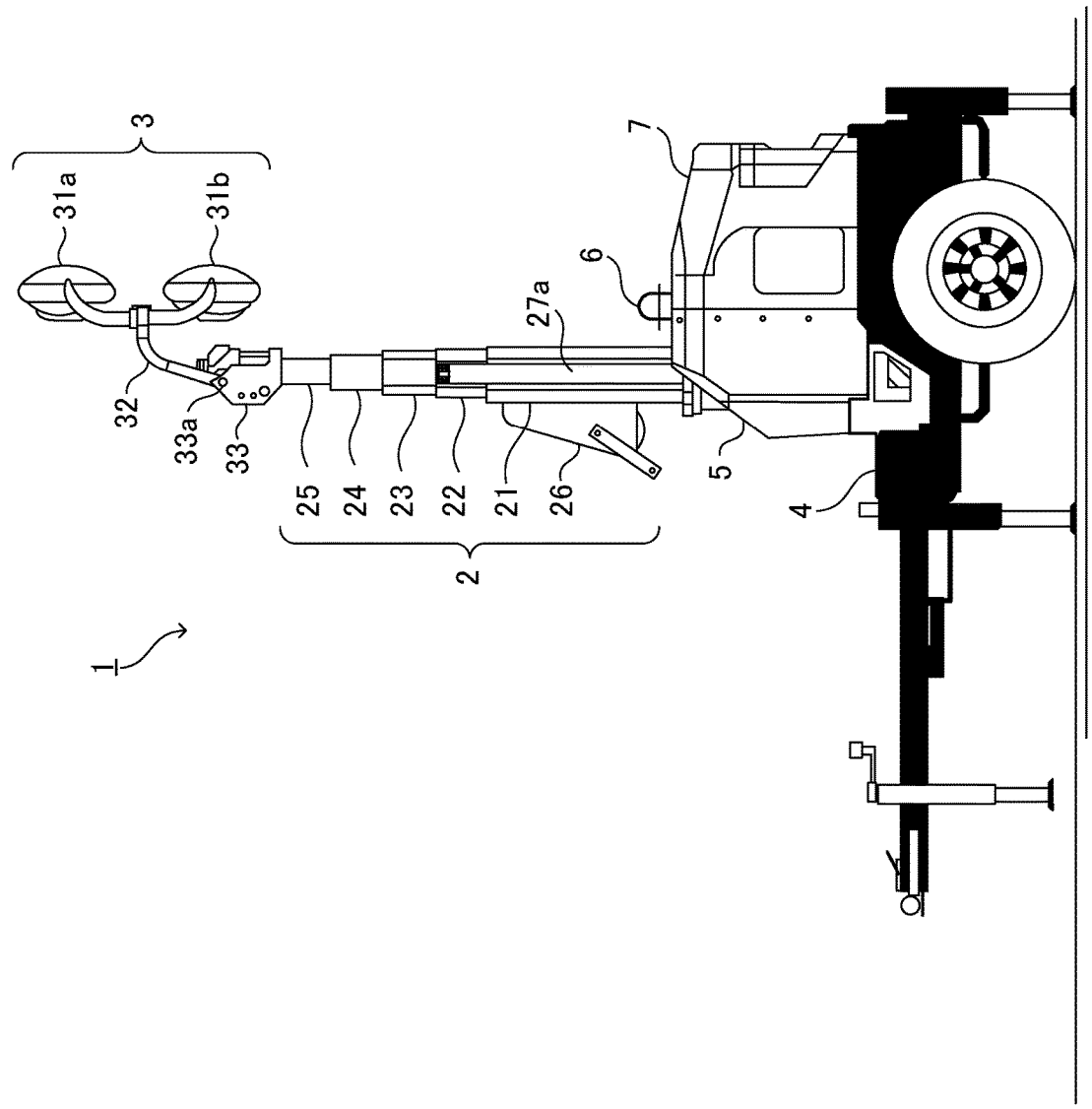
FIG. 1 is a side view of a floodlight according to an embodiment of the present invention.
Figure 2:
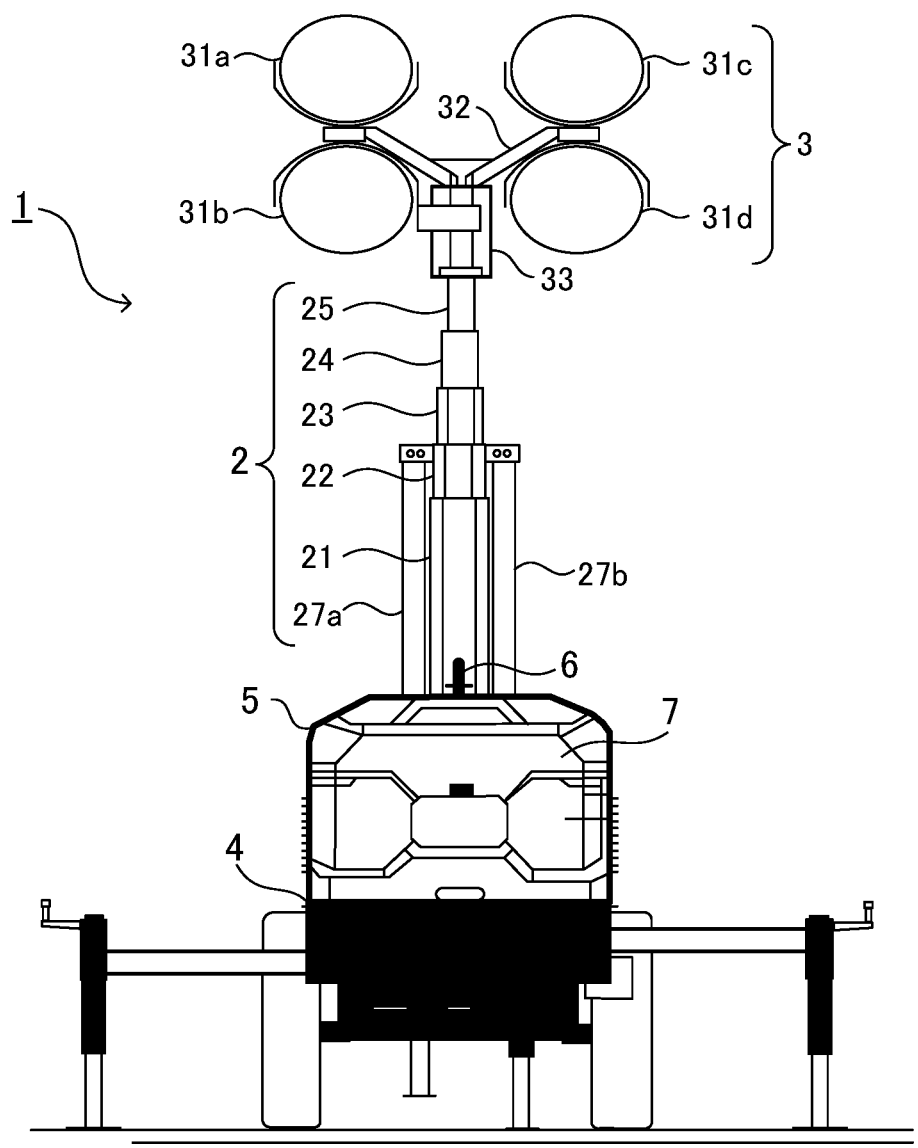
FIG. 2 is a front view of the floodlight according to the embodiment of the present invention.

FIG. 1 is a side view of a floodlight 1 according to the present embodiment, and FIG. 2 is a front view of the floodlight 1 according to the present embodiment. The floodlight 1 of the present embodiment is configured to include a telescopic post 2, a raising and lowering unit 26, dampers 27a, 27b, a lighting unit 3, a base 4, a cover 5, a pickup grip 6, and a power supply unit 7. It is sufficient that the floodlight 1 according to the present invention includes at least the telescopic post 2, the dampers 27a, 27b, the raising and lowering unit 26, the lighting unit 3, and the base 4.

The telescopic post 2 is a device for moving the lighting unit 3 up and down, and is configured to have first to fifth posts 21 to 25 in the present embodiment. The first to fifth posts 21 to 25 are configured such that their outer diameters are made gradually smaller so as to be loosely fitted into one another. The lower end of the first post 21 located at the lowermost position is fixed to the base 4. In FIG. 1, the lower end of the first post 21 is covered with the cover 5.

The raising and lowering unit 26 is a device that extends and contracts, in an up-down direction, the first to fifth posts in conjunction with each other. In the present embodiment, a handle that can be manually operated is provided on the side surface of the first post 21. By operating the handle, the length of a wire provided inside the telescopic post 2 can be adjusted, so that the telescopic post 2 can be extended and contracted in the up-down direction. In accordance with the extension and contraction of the telescopic post 2, the lighting unit 3 attached to the fifth post 25 is moved up and down. The raising and lowering mechanism of the raising and lowering unit 26 is not limited to a form in which a wire is used, and various mechanisms such as using a gear can be adopted. The raising and lowering unit 26 may be one using a drive means such as a motor or an engine, without being limited to one that is manually operated using a handle.

The dampers 27a, 27b are arranged on the left and right side surfaces of the telescopic post 2, respectively. In the present embodiment, they are fixed to connect the lower position of the side wall of the first post 21 and the upper position of the side wall of the second post 22. The dampers 27a, 27b are configured to have a cylinder and a piston that slides inside the cylinder. The dampers 27a, 27b have functions of exerting a biasing force in the up-down direction and suppressing the lighting unit 3 from falling down even if a failure, such as breaking of the wire in the raising and lowering unit 26, occurs. Further, the dampers are arranged symmetrically with the telescopic post 2 interposed therebetween, so that the telescopic post 2 can be extended and contracted smoothly and in a well-balanced manner.

It is considered that as the dampers 27a, 27b, gas dampers that use gas are used. However, when the gas dampers are used, the piston is scratched if it is slid while foreign matter such as stones or sand are attached to the piston. Therefore, It is considered that the gas for exerting a biasing force may escape from the scratches and the biasing force may be lost or weakened. Therefore, in the present embodiment, the cylinder is arranged at a higher position and the piston at a lower position. By arranging in this way, the piston is arranged in the cover 5, so that the piston can be easily protected from foreign matter.

Further, in the present embodiment, the dampers 27a, 27b are provided outside, so that either of the dampers 27a, 27b can be easily replaced even if a problem occurs with the either of them. Furthermore, the surface condition of the piston can be easily and visually checked from the outside, so that a scratch that may cause the above gas escape can be early detected.

The fifth post 25 is provided with the lighting unit 3 that lights the surroundings. The lighting unit 3 of the present embodiment is configured to include four lights 31a to 31d, a pedestal fixed to the fifth post 25, and a support unit 32 that supports the lights 31a to 31d. Although LEDs are used for the lights 31a to 31d of the present embodiment, various light sources such as metal halide lamps can be used in addition to LEDs. In addition, directional light sources that light the front are adopted for the lights 31a to 31d of the present embodiment, but omni-directional light sources, such as balloon type lighting that is often used today, may also be used.

The base 4 of the present embodiment is configured to include two wheels for easy movement. The base 4 has only to be a member capable of fixing the telescopic post 2 and performing positioning, and it is not essential to have wheels. In the present embodiment, the base 4 and the first post 21 are rotatably fixed, and by rotating the first post 21 with respect to the base 4, the direction in which the lighting unit 3 lights can be changed. The power supply unit 7 is provided on the base 4 and in the cover 5. The power supply unit 7 is a means that supplies power to the lights 31a to 31d, and is configured to include an engine for power generation, an alternator, a fuel tank, a battery, etc. It is noted that the power supply unit 7 is not limited to the form of being installed on the base 4 as in the present embodiment, and may be configured to be installed outside.

The pickup grip 6 used for transporting the floodlight 1 is provided above the cover 5. The pickup grip 6 is firmly fixed to the base 4. By hooking the pickup grip 6 on a crane hook or the like, the floodlight 1 can be hung. The floodlight 1 of the present embodiment can be folded compactly when transported or the like.

Figure 3:
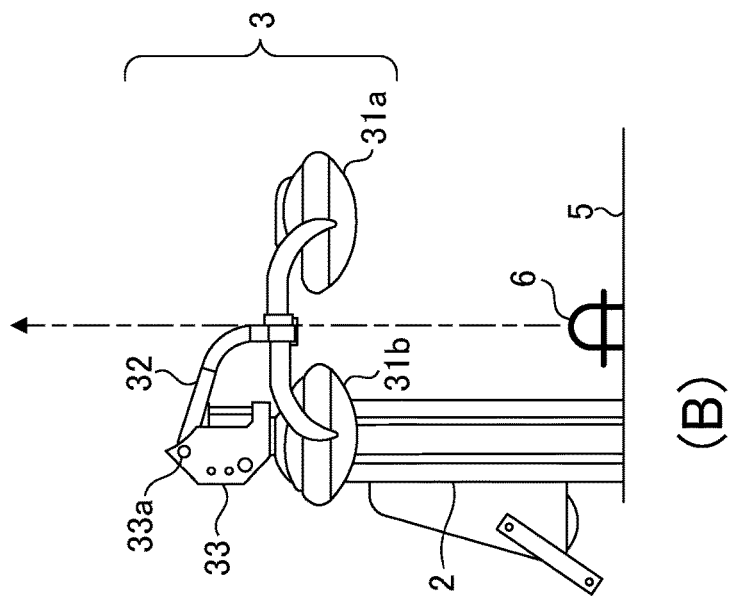
FIG. 3 is side views of a standing state and a housed state of a lighting unit according to the embodiment of the present invention.
Figure 3:
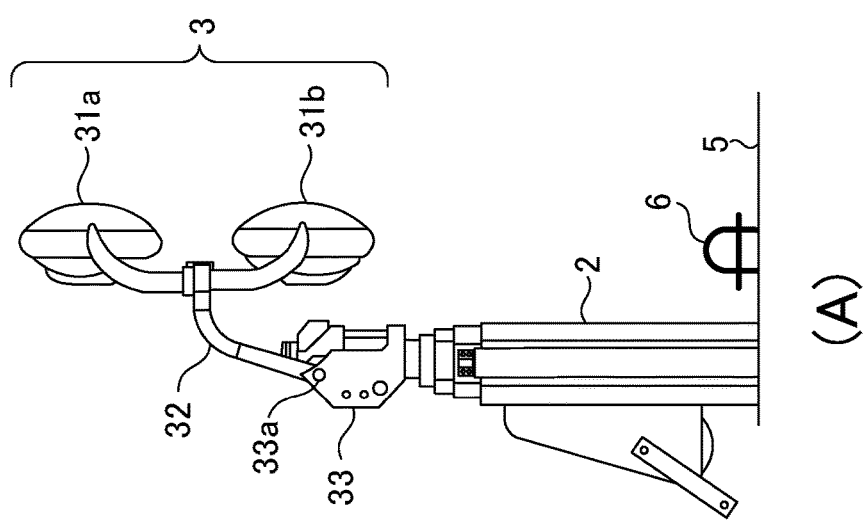

FIG. 3(A) is a side view showing a standing state of the lighting unit 3, and FIG. 3(B) is a side view showing a housed state of the lighting unit 3. The support unit 32 is rotatably provided around a rotating shaft 33a with respect to the pedestal 33. When the floodlight 1 is used, etc., the lighting unit 3 is brought to the standing state as shown in FIG. 3(A), and when the floodlight 1 is transported, etc., the lighting unit 3 is brought to the housed state as shown in FIG. 3(B) by rotating the support unit 32 around the rotating shaft 33a. By bringing to the housed state in this way, the height of the floodlight 1 can be reduced and the transportation of it, etc., can be easily performed.

In addition, it is preferable that it is configured such that when the lighting unit 3 is rotated, the perpendicular upper portion of the pickup grip 6 is opened, that is, the lighting unit 3 does not interfere with a cable for the hanging. Since the lights 31a to 31d are heavy, the position of the center of gravity of the floodlight 1 changes when the light 31a to 31d are brought from the standing state to the housed state. Therefore, it is preferable that the position of the pickup grip 6 is set to a position corresponding to the position of the center of gravity in the housed state. When the floodlight 1 in the housed state is hung using the pickup grip 6, it can be hung while keeping it in parallel.

Figure 4:
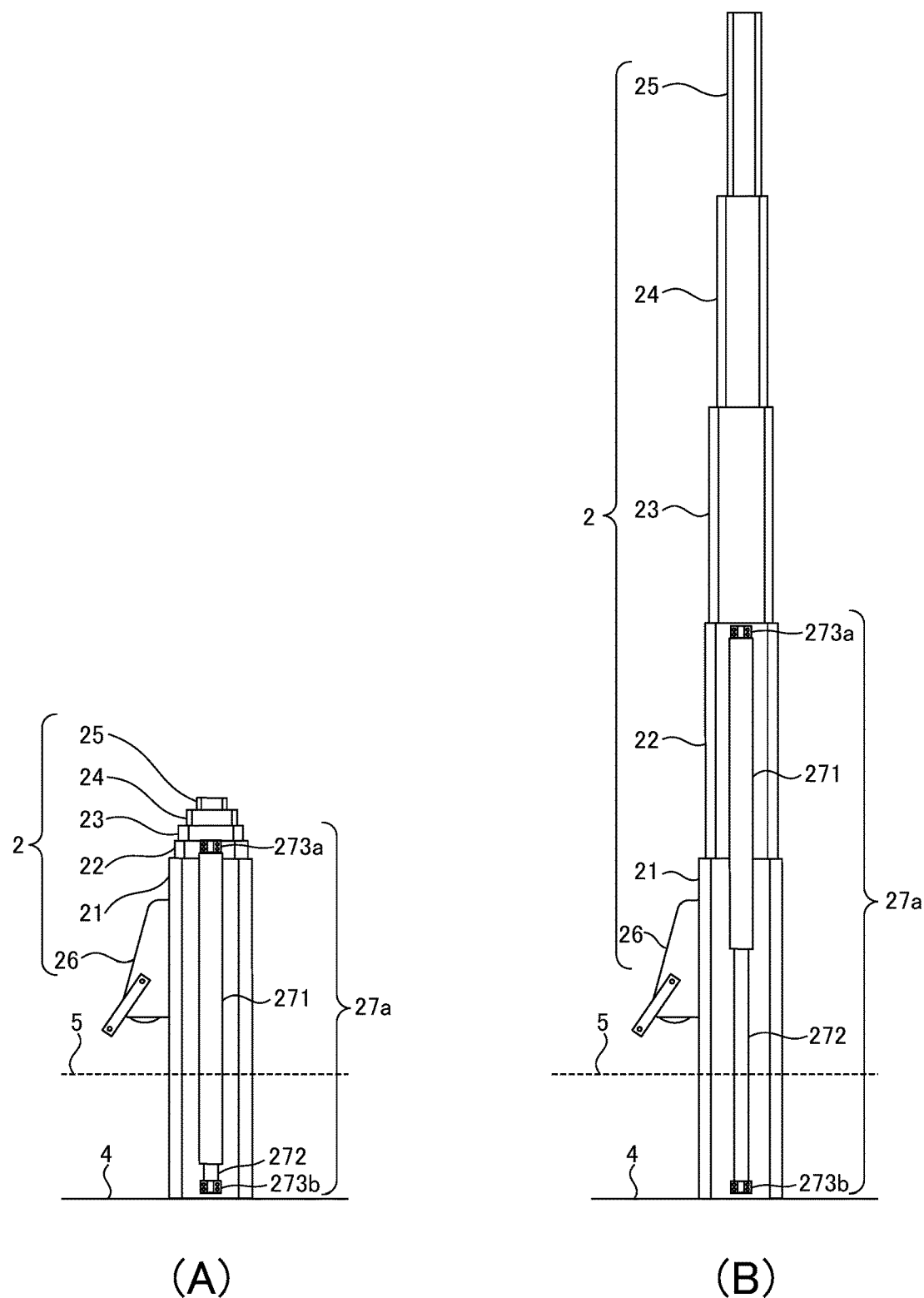
FIG. 4 is a view showing a contracted state and an extended state of a telescopic post according to the embodiment of the present invention.
Figure 5:
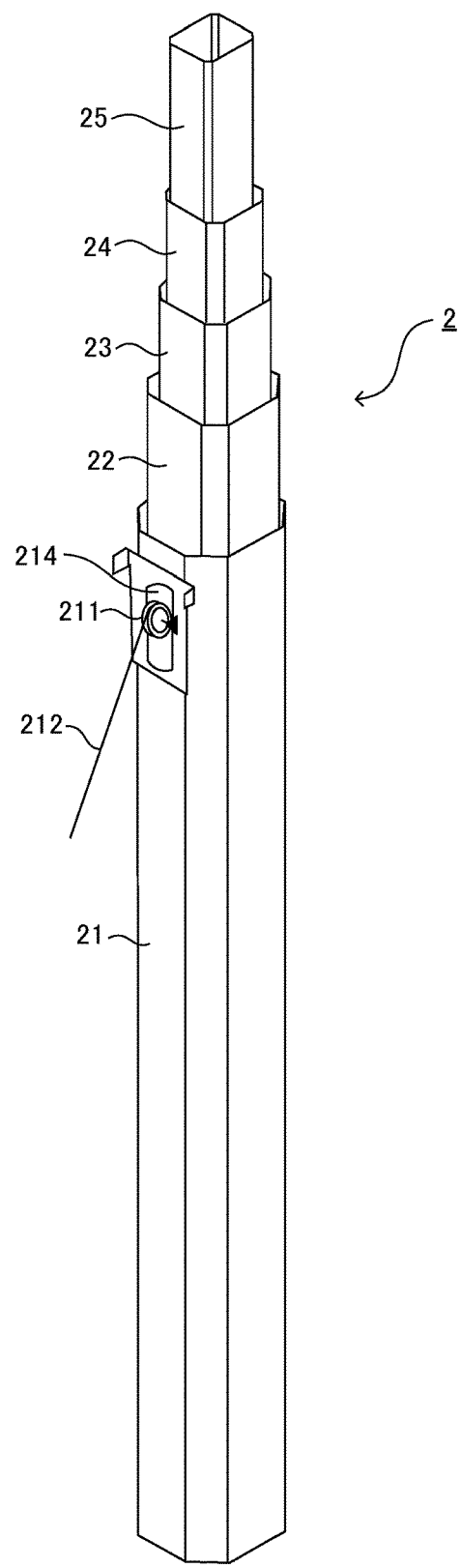
FIG. 5 is a perspective view of the telescopic post according to the embodiment of the present invention.
Figure 6:
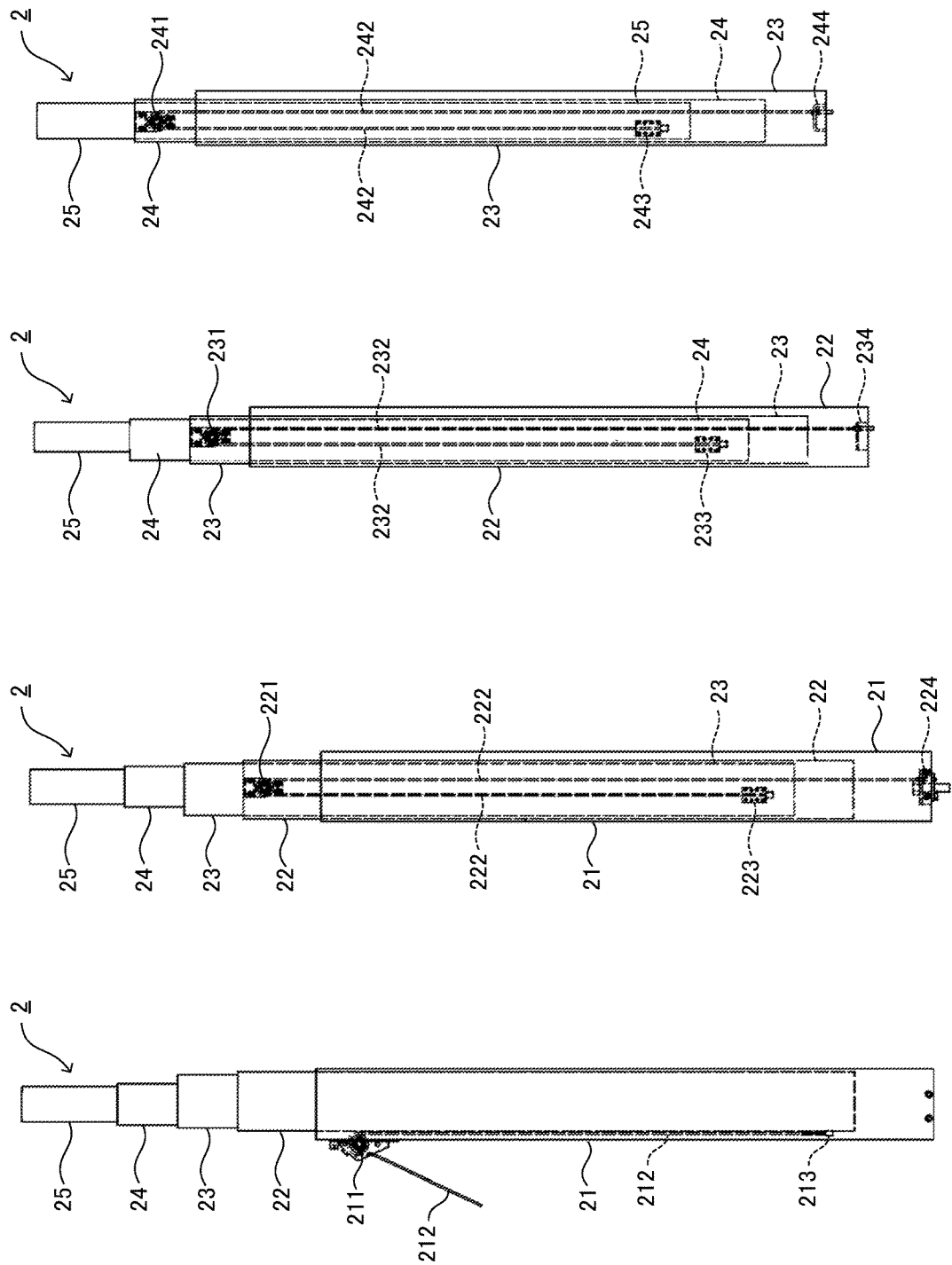
FIG. 6 is a view for explaining a telescopic movement of the telescopic post according to the embodiment of the present invention.

Next, the telescopic structure of the telescopic post 2 of the present embodiment will be described in detail. FIG. 4 is a view showing a contracted state (FIG. 4(A)) and an extended state (FIG. 4(B)) of the telescopic post 2 according to the embodiment of the present invention. FIGS. 4 to 6 show states in which the lighting unit 3 located at the upper end of the fifth post 25 is removed.

As shown in FIG. 4(A), the first to fifth posts 21 to 25 are housed inside each other in the contracted state, thereby creating the shortest state. The lower end of the first post 21 is fixed to the base 4. In the present embodiment, the first post 21 can be rotated with respect to the base 4, so that the direction in which the lighting unit 3 lights can be changed. In the extended state shown in FIG. 4(B), the telescopic post 2 is extended upward. In the present embodiment, the telescopic post 2 can be extended up to 7 m.

The damper 27a is configured to include a cylinder 271, a piston 272, and fixing portions 273a, 273b. In the present embodiment, the two dampers 27a, 27b are used, and the other damper 27b is located on the opposite side to the damper 27a with the first post 21 interposed therebetween. In the present embodiment, gas dampers are used for the dampers 27a, 27b, in which a biasing force can be exerted between the cylinder 271 and the piston 272 by the gas filled in the dampers 27a, 27b.

The fixing portion 273a on the cylinder 271 side is fixed to the side wall of the second post 22. The fixing portion 273b on the piston 272 side is fixed to the side wall of the first post 21. In the present embodiment, by fixing the fixing portion 273a to the upper portion of the second post 22 and the fixing portion 273b to the lower portion of the first post 21, the extensible amounts of the first post 21 and the second post 22 are maximized. In the present embodiment, the first to fifth posts 21 to 25 are configured to be extended and contracted in conjunction with each other. However, it is configured such that even if a failure, such as breaking of the wire used in the raising and lowering unit 26, occurs, the lighting unit 3 can be prevented from suddenly falling down by the biasing forces of the damper 27a, 27b. Therefore, the lighting unit 3 can be suppressed from being damaged or colliding with a worker.

It is preferable that the position of the lighting unit 3, when the first post 21 and the second post 22 are only extended, is higher than the height of a general person (worker). Even if the third to fifth posts 23 to 25 fall down due to a failure of the raising and lowering unit 26, etc., the lighting unit 3 can be suppressed from colliding with the head of a worker, etc., by the biasing forces of the dampers 27a, 27b.

The lower portion of the telescopic post 2 is located inside the cover 5. With such a configuration, the lower portion of the damper 27a is located in the cover 5 when the telescopic post is contracted as shown in FIG. 4(A). Thereby, adherence of foreign matter to the piston 272 can be suppressed. When the telescopic post is extended as shown in FIG. 4(B), the piston 272 is exposed from the cover 5. Therefore, it is more preferable to provide an extensible covering member, such as an accordion member, around the piston 272.

FIG. 5 is a perspective view of the telescopic post 2 according to the embodiment of the present invention. In the present embodiment, the cross-sectional shape of each of the first to fifth posts 21 to 25 constituting the telescopic post 2 is an octagonal shape in which the four corners of a quadrilateral shape are chamfered in a straight line. With such a cross-sectional shape, the first to fifth posts 21 to 25 can smoothly perform telescopic movements without being inadvertently rotated.

Figure 7:
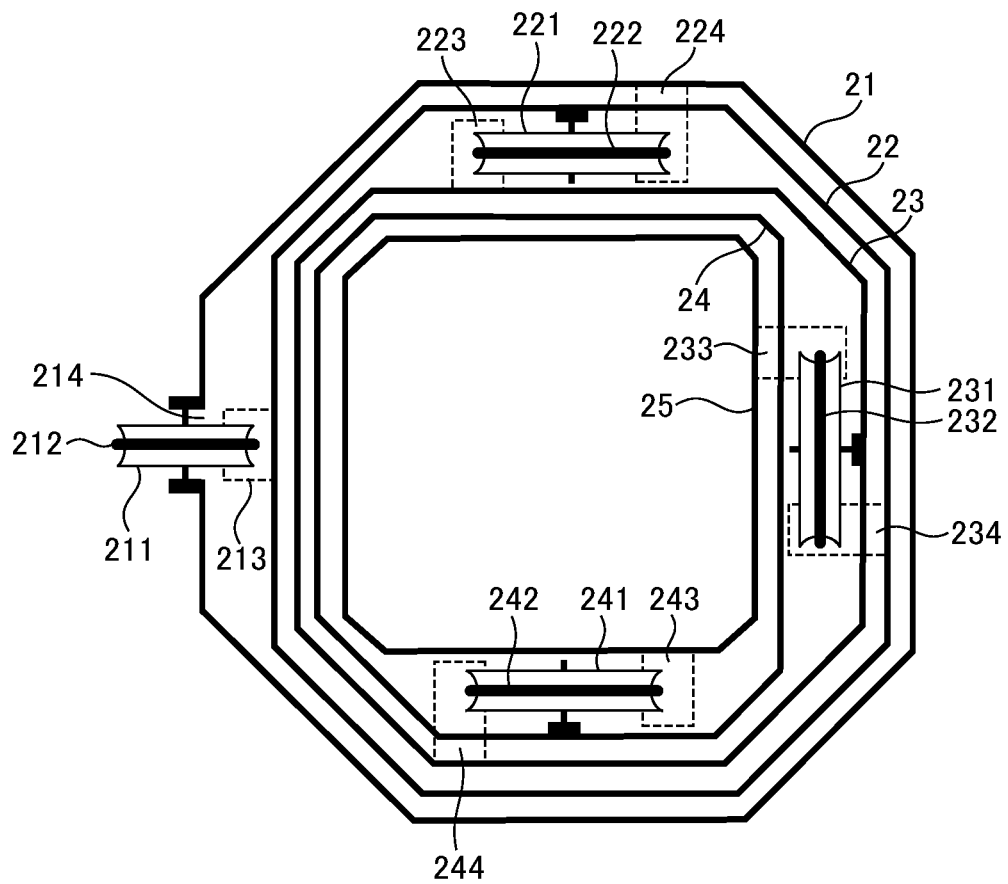
FIG. 7 is a cross-sectional view of the telescopic post according to the embodiment of the present invention.

FIG. 6 is a view for explaining telescopic movements of the telescopic post 2 according to the embodiment of the present invention, and FIG. 7 shows a cross-sectional view of the telescopic post 2 according to the embodiment of the present invention. The telescopic mechanism of the telescopic post 2 will be described with reference to FIGS. 6 and 7. As described with reference to FIG. 5, each of the first to fifth posts 21 to 25 has an octagonal cross-sectional shape in which the four corners of a quadrilateral square shape are chamfered. As shown in FIG. 7, the second post 22 is loosely fitted into the first post 21. The space between the first post 21 and the second post 22 is formed by movement regulating units (near the upper, right, and lower portions of FIG. 7) each of which regulates a telescopic movement by being brought close to each other and a space-forming unit (near the left portion of FIG. 7) that forms a space where the pulley 211, etc., are to be provided, by being spaced apart from each other. By providing the movement regulating units, telescopic movements are regulated. Thereby, the first post 21 and the second post can be extended and contracted smoothly, and the space formed by the space-forming unit can also be kept at a certain amount without being crushed by the movements of the first post 21 and the second post.

The pulley 211 is arranged in the space that is formed by the first post 21 and the second post and by the space-forming unit. On the wall surface of the first post 21, a through-hole 214 for installing the pulley 211 is provided. This is for introducing a wire 212 from the outside into the space between the first post 21 and the second post 22. The pulley 211 is arranged in the through-hole 214 such that its rotating surface is perpendicular to the wall surface of the first post 21. The wire 212 introduced from the outside is wound around the pulley 211, then dropped vertically downward or substantially vertically downward, and is fixed to the fixing portion 213 provided on the wall surface of the second post 22.

FIG. 6(A) shows a state in which the wire 212 is arranged. By pulling the wire 212 from the outside, the second post 22 is raised with respect to the first post 21. At that time, the first post 21 and the second post 22 are extended and contracted along a rail by the above extension and contraction regulating units. So, they can be extended and contracted smoothly, and the second post 22 can be extended substantially vertically upward without being extended while being greatly bent to the first post 21. Further, the pulley 211 of sufficient size can be arranged by the space-forming unit by which a space of a certain size can be ensured without being crushed by the sliding of the first post 21 and the second post 22. Therefore, smooth movements can be made by the wire 212.

Next, the raising and lowering of the third post 23 in accordance with the raising and lowering of the second post 22 will be described. As shown in FIG. 7, the third post 23 is loosely fitted into the second post 22. Similarly to the case of the first post 21 and the second post 22, the space between the second post 22 and the third post 23 is formed by movement regulating units (near the right, lower, and left portions of FIG. 7) each of which regulates a telescopic movement by being brought close to each other and a space-forming unit (near the upper portion of FIG. 7) that forms a space where a pulley 221, etc., are to be provided, by being spaced apart from each other.

The pulley 221 is arranged in the space that is formed by the second post 22 and the third post 23 and by the space-forming unit. The pulley 221 is fixed to the inner wall of the second post 22, around which a wire 222 connecting the first post 21 and the third post 23 is wound. Here, the rotating shaft of the pulley 221 is provided to be perpendicular (or substantially perpendicular) to the wall surface of the second post 22. Therefore, the rotating surface of the pulley 221 is arranged along the wall surface of the second post 22, so that the pulley 221 of sufficient size can be arranged without the need to inadvertently thicken the second post 22.

One end of the wire 222 that is wound around the pulley 221 is fixed to a fixing portion 224 provided in the lower portion of the first post 21, and the other end is fixed to a fixing portion 223 provided on the side surface of the third post 23. As can be seen from FIGS. 6(B) and 7, the wire 222 is arranged to drop substantially vertically from the pulley 221 to the fixing portion 223 or the fixing portion 224. Such an arrangement of the wire 222 enables the wire 222 and the pulley 221 to move smoothly. Since the wire 222 and the pulley 221 are arranged in a space (space formed by the space-forming unit) that is not hindered by the extension and contraction of the second post 22 and the third post 23, the second post 22 and the third post 23 can be extended and contracted smoothly, and failures, such as break down of the pulley 221 or the like due to repeated sliding and breaking of the wire 222 due to repeated sliding, can be suppressed.

As described with reference to FIG. 6(A), the second post 22 is raised by pulling the wire 212 from the outside. With reference to FIG. 6(B), the pulley 221 provided to the second post 22 is raised in accordance with the raising of the second post 22. When the wire 222 wound around the pulley 221 raises the fixing portion 223 fixed to the third post 23, the third post 23 is raised.

Next, the raising and lowering of the fourth post 24 in accordance with the raising and lowering of the third post 23 will be described. As shown in FIG. 7, the fourth post 24 is loosely fitted into the third post 23. Similarly to the case of the first post 21 and the second post 22, the space between the third post 23 and the fourth post 24 is formed by movement regulating units (near the lower, left, and right portions of FIG. 7) each of which regulates a telescopic movement by being brought close to each other and a space-forming unit (near the right portion of FIG. 7) that forms a space where a pulley 231, etc., are to be provided, by being spaced apart from each other.

The pulley 231 is arranged in the space that is formed by the third post 23 and the fourth post 24 and by the space-forming unit. The pulley 231 is fixed to the inner wall of the third post 23, around which a wire 232 connecting the second post 22 and the fourth post 24 is wound. Here, the rotating shaft of the pulley 231 is provided to be perpendicular (or substantially perpendicular) to the wall surface of the third post 23. Therefore, the rotating surface of the pulley 231 is arranged along the wall surface of the third post 23, so that the pulley 231 of sufficient size can be arranged without the need to inadvertently thicken the third post 23.

One end of the wire 232 that is wound around the pulley 231 is fixed to a fixing portion 234 provided in the lower portion of the second post 22, and the other end is fixed to a fixing portion 233 provided on the side surface of the fourth post 24. As can be seen from FIGS. 6(C) and 7, the wire 232 is arranged to drop substantially vertically from the pulley 231 to the fixing portion 233 or the fixing portion 234.

As described with reference to FIGS. 6(A) and 6(B), the third post 23 is raised in conjunction with the pulling of the wire 212. With reference to FIG. 6(C), the pulley 231 provided to the third post 23 is raised in accordance with the raising of the third post 23. When the wire 232 wound around the pulley 231 raises the fixing portion 233 fixed to the fourth post 24, the fourth post 24 is raised.

Next, the raising and lowering of the fifth post 25 in accordance with the raising and lowering of the fourth post 24 will be described. As shown in FIG. 7, the fourth post 24 is loosely fitted into the fifth post 25. Similarly to the case of the first post 21 and the second post 22, the space between the fourth post 24 and the fifth post 25 is formed by movement regulating units (near the left, upper, and right portions of FIG. 7) each of which regulates a telescopic movement by being brought close to each other and a space-forming unit (near the lower portion of FIG. 7) that forms a space where a pulley 241, etc., are to be provided, by being spaced apart from each other.

The pulley 241 is arranged in the space that is formed by the fourth post 24 and the fifth post 25 and by the space-forming unit. The pulley 241 is fixed to the inner wall of the fourth post 24, around which a wire 242 connecting the third post 23 and the fifth post 25 is wound. Here, the rotating shaft of the pulley 241 is provided to be perpendicular (or substantially perpendicular) to the wall surface of the fourth post 24. Therefore, the rotating surface of the pulley 241 is arranged along the wall surface of the fourth post 24, so that the pulley 241 of sufficient size can be arranged without the need to inadvertently thicken the fourth post 24.

One end of the wire 242 that is wound around the pulley 241 is fixed to a fixing portion 244 provided in the lower portion of the third post 23, and the other end is fixed to a fixing portion 243 provided on the side surface of the fifth post 25. As can be seen from FIGS. 6(D) and 7, the wire 242 is arranged to drop substantially vertically from the pulley 241 to the fixing portion 243 or the fixing portion 244.

As described with reference to FIGS. 6(A) and 6(C), the fourth post 24 is raised in conjunction with the pulling of the wire 212. With reference to FIG. 6(D), the pulley 241 provided to the fourth post 24 is raised in accordance with the raising of the fourth post 24. When the wire 242 wound around the pulley 241 raises the fixing portion 243 fixed to the fifth post 25, the fifth post 25 is raised.

As described above with reference to FIGS. 6(A) to 6(D) and 7, when the wire 212 exposed outside of the telescopic post 2 is wound by a drum provided in the raising and lowering unit 26, the second post 22 is raised. Then, in accordance with the raising of the second post 22, the third post 23, the fourth post 24, and the fifth post 25 are raised in conjunction with each other. In the present embodiment, by providing the movement regulating unit between each of the adjacent posts, such as the first post 21 and the second post 22, of the first to fifth posts 21 to 25, the posts can be slid smoothly and raised and lowered vertically (or substantially vertically). Further, by providing the space-forming units, the pulleys 211, 221, 231, and 241 are arranged in spaces that are not hindered by the sliding of the first to fifth posts 21 to 25, so that the posts can be raised and lowered smoothly.

Further, by arranging, as shown in FIG. 7, the spaces formed by the space-forming units at different positions in terms of the cross-sectional circumferences of the telescopic post 2 (the space formed by the first post 21 and the second post 22 is located in the left portion of FIG. 7, the space formed by the second post 22 and the third post 23 is located in the upper portion of FIG. 7, the space formed by the third post 23 and the fourth post 24 is located in the right portion of FIG. 7, and the space formed by the fourth post 24 and the fifth post 25 is located in the lower portion of FIG. 7), the telescopic post 2 is prevented from becoming unnecessarily thick, and the telescopic post 2 can be extended and contracted in a well-balanced manner.

The telescopic mechanism of the telescopic post 2 used in the floodlight 1 of the present embodiment has been described above. By providing, as shown in the cross section of FIG. 7, the movement regulating unit and the space-forming unit between each of the adjacent posts of the first to fifth posts 21 to 25, the telescopic post 2 of the present embodiment can be slid smoothly and vertically (or substantially vertically). And, by housing the members that perform telescopic movements, such as the pulleys 211, 221, 231, 241 and the wires 212, 222, 232, 242, in the spaces formed by the space-forming units, these members can be moved without being hindered by the extension and contraction, smooth extension and contraction can be performed, and failures of the members that perform telescopic movements, such as the pulleys and the wires, can be suppressed. Further, in the present embodiment, by providing dampers 27a, 27b between the first post 21 and the second post 22, the direction in which the second post 22 is raised and lowered, with respect to the first post 21, is properly regulated. Thereby, the telescopic post 2 can be raised and lowered further smoothly.

In the present embodiment, the first to fifth posts 21 to 25 have, as their cross-sectional shapes, an octagonal shape in which the four corners of a quadrilateral shape are chamfered in a straight line, as shown in FIG. 7, so that the movement regulating units and the space-forming units are realized. However, the cross-sectional shapes are not limited to such a shape, and may be a polygon of pentagon or more. Alternatively, the posts may be configured to have a shape with a curved surface.

In the present embodiment, the telescopic post 2 that raises and lowers the lighting unit 3 in the floodlight 1 has been described, but the telescopic post 2 can also be applied to things other than the floodlight 1. That is, the telescopic post 2 can also be regarded as an object of the invention by using it as a single body.

REFERENCE SIGNS LIST 1 floodlight
2 telescopic post
3 lighting unit
4 base
5 cover
6 pickup grip
7 power supply unit
21 to 25 first to fifth posts
26 raising and lowering unit
27a, 27b damper
31a to 31d light
32 support unit
33 pedestal
33a rotating shaft
211, 221, 231, 241 pulley
212, 222, 232, 242 wire
213, 223, 233, 243 fixing portion
214, 224, 234, 244 fixing portion
214 through-hole
271 cylinder
272 piston
273a, 273b fixing portion

The invention claimed is:

1. A floodlight comprising:
   a telescopic post that has a plurality of posts whose outer diameters are made gradually smaller, into which the posts can be loosely fitted, and that can be extended and contracted in an up-down direction;
   a lighting unit attached to the post located on the innermost side;
   a raising and lowering unit that extends and contracts, in the up-down direction, the posts in conjunction with each other;
   a base that the post located on the outermost side is fixed to; and
   a damper that has one end fixed to an outer side surface of the post located on the outermost side and the other end fixed to an outer side surface of the post located on the second outermost side.

2. The floodlight according to claim 1, wherein
   the damper has a cylinder and a piston to be housed in the cylinder,
   a side of the piston is fixed to the outer side surface of the post located on the outermost side, and
   a side of the cylinder is fixed to the outer side surface of the post located on the second outermost side.

3. The floodlight according to claim 2, wherein
   a lower portion of the damper is located in a cover.

4. The floodlight according to claim 1, wherein
   a plurality of the dampers are provided.

5. The floodlight according to claim 1, wherein
   a movement regulating unit and a space-forming unit are formed, in terms of cross section, between the posts adjacent to each other,
   the movement regulating unit regulates a telescopic movement with the post located on an inner side brought close to the post located on an outer side, and
   the space-forming unit allows a member that performs a telescopic movement to be arranged, with the post located on an inner side spaced apart from the post located on an outer side.

\* \* \* \* \*